(12) United States Patent
Dick et al.

(10) Patent No.: US 8,942,187 B2
(45) Date of Patent: Jan. 27, 2015

(54) METHOD AND APPARATUS FOR CONTROL CHANNEL OPERATION IN GERAN

(75) Inventors: Stephen G. Dick, Nesconset, NY (US); Marian Rudolf, Montreal (CA); Behrouz Aghili, Commack, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 946 days.

(21) Appl. No.: 12/539,163

(22) Filed: Aug. 11, 2009

(65) Prior Publication Data

US 2010/0067440 A1    Mar. 18, 2010

Related U.S. Application Data

(60) Provisional application No. 61/088,304, filed on Aug. 12, 2008.

(51) Int. Cl.
| | |
|---|---|
| *H04W 4/00* | (2009.01) |
| *H04H 20/67* | (2008.01) |
| *H04L 5/12* | (2006.01) |
| *H04L 5/00* | (2006.01) |
| *H04L 27/34* | (2006.01) |
| *H04W 72/04* | (2009.01) |

(52) U.S. Cl.
CPC .............. *H04L 5/12* (2013.01); *H04L 5/0053* (2013.01); *H04L 27/3483* (2013.01); *H04W 72/04* (2013.01)
USPC .......................................... 370/329; 370/339

(58) Field of Classification Search
USPC ......................................... 370/329, 339, 465
See application file for complete search history.

(56) References Cited

U.S. PATENT DOCUMENTS

| | | | |
|---|---|---|---|
| 5,790,549 A | 8/1998 | Dent | |
| 6,144,653 A * | 11/2000 | Persson et al. | 370/337 |
| 6,230,015 B1 | 5/2001 | Kinnunen et al. | |
| 6,662,024 B2 | 12/2003 | Walton et al. | |
| 7,110,378 B2 | 9/2006 | Onggosanusi et al. | |

(Continued)

FOREIGN PATENT DOCUMENTS

WO        0172080 A1    9/2001

OTHER PUBLICATIONS

China Mobile, et al. "Requirements on Evaluation of New Techniques for GSM Voice Capacity Enhancement", 3GPP TSG Geran #36, GP-071679, (Vancouver, British Colombia, Canada, Nov. 12 to 16, 2007).

(Continued)

*Primary Examiner* — Afshawn Towfighi
(74) *Attorney, Agent, or Firm* — Volpe and Koenig, P.C.

(57) ABSTRACT

A method and apparatus to improve the quality of control signaling based on signaling messages controlling speech or data transmission over an air interface between at least two Multi-User-Reusing-One-Slot/Voice Services Over Adaptive Multiuser Channels On One Slot (MUROS/VAMOS) capable wireless transmit/receive units (WTRUs). The WTRUs communicate with each other at the physical layer via signaling messages transmitted in control channels such as Slow Associated Control Channel (SACCH) and Fast Associated Control Channel (FACCH). Speech services are provided simultaneously over the same physical channel, and the Timing Advance (TA) and Power Command (PC) parameters of a WTRU are multiplexed in several occurrences of the SACCH or FACCH to increase the number of channel bits available for channel coding.

36 Claims, 9 Drawing Sheets

(56) References Cited

U.S. PATENT DOCUMENTS

| | | | |
|---|---|---|---|
| 2003/0012175 A1 | 1/2003 | Sebire | |
| 2004/0170148 A1* | 9/2004 | Parkkinen et al. | 370/337 |
| 2005/0068909 A1 | 3/2005 | Chae et al. | |
| 2008/0159246 A1* | 7/2008 | Niemela | 370/339 |
| 2008/0240151 A1 | 10/2008 | Chitrapu et al. | |
| 2009/0323588 A1 | 12/2009 | Aghili et al. | |

OTHER PUBLICATIONS

Huawei Technologies Co., Ltd., "Associated Control Channel Performance of Downlink MUROS," 3GPP TSG-GERAN #39, Tdoc GP-081025, Agenda Item 7.1.5.10, (Florence, Italy, Aug. 25-29, 2008).

Huawei Technologies Co., Ltd., "New strategy on SACCH for Downlink MUROS," 3GPP TSG GERAN #39, GP-081026 (Aug. 2008).

Third Generation Partnership Project, "Technical Specification Group GSM/EDGE Radio Access Network; Multiplexing and multiple access on the radio path (Release 4)," 3GPP TS 45.002 V4.8.0 (Jun. 2003).

Third Generation Partnership Project, "Technical Specification Group GSM/EDGE Radio Access Network; Multiplexing and multiple access on the radio path (Release 5)," 3GPP TS 45.002 V5.13.0 (Jan. 2005).

Third Generation Partnership Project, "Technical Specification Group GSM/EDGE Radio Access Network; Multiplexing and multiple access on the radio path (Release 6)," 3GPP TS 45.002 V6.12.0 (Nov. 2005).

Third Generation Partnership Project, "Technical Specification Group GSM EDGE Radio Access Network; Mobile Station—Base Station System (MS-BSS) interface; Data Link (DL) layer specification (Release 4)," 3GPP TS 44.006 V4.1.1 (Dec. 2003).

Third Generation Partnership Project, "Technical Specification Group GSM EDGE Radio Access Network; Mobile Station—Base Station System (MS-BSS) interface; Data Link (DL) layer specification (Release 4)," 3GPP TS 44.006 V4.3.0 (Dec. 2008).

Third Generation Partnership Project, "Technical Specification Group GSM EDGE Radio Access Network; Mobile Station—Base Station System (MS-BSS) interface; Data Link (DL) layer specification (Release 6)," 3GPP TS 44.006 V6.8.0 (Dec. 2008).

Third Generation Partnership Project, "Technical Specification Group GSM EDGE Radio Access Network; Mobile Station—Base Station System (MS-BSS) interface; Data Link (DL) layer specification (Release 5)," 3GPP TS 44.006 V5.2.0 (Dec. 2008).

Third Generation Partnership Project, "Technical Specification Group GSM EDGE Radio Access Network; Mobile Station—Base Station System (MS-BSS) interface; Data Link (DL) layer specification (Release 5)," 3GPP TS 44.006 V5.0.1 (Dec. 2003).

Third Generation Partnership Project, "Technical Specification Group GSM/EDGE Radio Access Network; Mobile radio interface layer 3 specification; Radio Resource Control (RRC) protocol (Release 8)", 3GPP TS 44.018 V8.3.0 (May 2008).

Third Generation Partnership Project, "Technical Specification Group GSM/EDGE Radio Access Network; Multiplexing and multiple access on the radio path (Release 7)," 3GPP TS 45.002 V7.7.0 (May 2008).

Third Generation Partnership Project, "Technical Specification Group GSM/EDGE Radio Access Network; Physical layer on the radio path; General description (Release 5)," 3GPP TS 45.001 V5.9.0 (Apr. 2005).

Third Generation Partnership Project, "Technical Specification Group GSM/EDGE Radio Access Network; Physical layer on the radio path; General description (Release 4)," 3GPP TS 45.001 V4.5.0 (Apr. 2005).

Third Generation Partnership Project, "Technical Specification Group GSM/EDGE Radio Access Network; Physical layer on the radio path; General description (Release 6)," 3GPP TS 45.001 V6.8.0 (May 2007).

Third Generation Partnership Project, "Technical Specification Group GSM/EDGE Radio Access Network; Mobile radio interface layer 3 specification, Radio Resource Control (RRC) protocol (Release 4)," 3GPP TS 44.018 V4.23.0 (May 2006).

Third Generation Partnership Project, "Technical Specification Group GSM/EDGE Radio Access Network; Mobile radio interface layer 3 specification; Radio Resource Control (RRC) protocol (Release 5)," 3GPP TS 44.018 V5.22.0 (May 2006).

Third Generation Partnership Project, "Technical Specification Group GSM/EDGE Radio Access Network; Mobile radio interface layer 3 specification; Radio Resource Control (RRC) protocol (Release 5)," 3GPP TS 44.018 V5.23.0 (Feb. 2009).

Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.23.0 (Dec. 2007).

Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.24.0 (Feb. 2009).

Third Generation Partnership Project, "Technical Specification Group GSM/EDGE Radio Access Network; Mobile radio interface layer 3 specification; Radio Resource Control (RRC) protocol (Release 7)," 3GPP TS 44.018 V7.17.0 (May 2009).

Third Generation Partnership Project, "Technical Specification Group GSM/EDGE Radio Access Network; Mobile radio interface layer 3 specification; Radio Resource Control (RRC) protocol (Release 7)," 3GPP TS 44.018 V7.13.0 (May 2008).

Third Generation Partnership Project, "Technical Specification Group GSM/EDGE Radio Access Network; Physical layer on the radio path; General description (Release 7)," 3GPP TS 45.001 V7.8.0 (Aug. 2008).

Third Generation Partnership Project, "Technical Specification Group GSM/EDGE Radio Access Network; Physical layer on the radio path; General description (Release 8)," 3GPP TS 45.001 V8.0.0 (Dec. 2008).

Third Generation Partnership Project, "Technical Specification Group GSM/EDGE Radio Access Network; Multiplexing and multiple access on the radio path (Release 9)," 3GPP TS 45.002 V9.0.0 (May 2009).

Third Generation Partnership Project, "Technical Specification Group GSM/EDGE Radio Access Network; Multiplexing and multiple access on the radio path (Release 8)," 3GPP TS 45.002 V8.0.0 (Dec. 2008).

Third Generation Partnership Project, "Technical Specification Group GERAN; GSM/EDGE Radio Access Network (GERAN); Overall Description—Stage 2; (Release 4)," 3GPP TS 43.051 V4.0.0 (Nov. 2000).

Third Generation Partnership Project, "Technical Specification Group GSM/EDGE Radio Access Network; Overall description—Stage 2; (Release 5)," 3GPP TS 43.051 V5.10.0 (Aug. 2003).

Third Generation Partnership Project, "Technical Specification Group GSM/EDGE Radio Access Network; Overall description—Stage 2; (Release 6)," 3GPP TS 43.051 V6.0.0 (Nov. 2003).

Third Generation Partnership Project, "Technical Specification Group GSM/EDGE Radio Access Network; Overall description—Stage 2; (Release 7)," 3GPP TS 43.051 V7.0.0 (Aug. 2007).

Third Generation Partnership Project, "Technical Specification Group GSM/EDGE Radio Access Network; Overall description—Stage 2; (Release 8)," 3GPP TS 43.051 V8.0.0 (Dec. 2008).

Nokia, "Voice Capacity Evolution with Orthogonal Sub Channel," 3GPP TSG-GERAN Meeting #33, Change Request, GP-070214, (Seoul, South Korea, Feb. 12-16, 2007).

Nokia, "Voice Capacity Evolution with Orthogonal Sub Channel," 3GPP TSG-GERAN Meeting #33, GP-070214, (Seoul, South Korea, Feb. 12-16, 2007).

China Mobile, et al. "Requirements on Evaluation of New Techniques for GSM Voice Capacity Enhancement", 3GPP TSG Geran #36, GP-071679, (Vancouver, British Colombia, Canada, Nov. 12-16, 2007.

Nokia Siemens Networks et al., "Voice Capacity Evolution With Orthogonal Sub Channels", 3GPP TSG GERAN #36, GP-071792, Agenda Item 6.1, 7.1.5.18, (Vancouver, Canada, Nov. 12-16, 2007).

(56) References Cited

OTHER PUBLICATIONS

TELEFON AB LM Ericsson, On Orthogonal Sub Channels, 3GPP TSG GERAN #36, GP-071720, (Vancouver, Canada, Nov. 12-16, 2007).
TELEFON AB LM Ericsson, Link Performance of Orthogonal Sub Channels With Narrow Pulse Shaping Filter, 3GPP TSG GERAN #36, GP-071721, (Vancouver, Canada, Nov. 12-16, 2007).
ZTE Corporation, "Discussion Paper on OSC", 3GPP TSG GERAN #36, GP-071785, (Vancouver, Canada, Nov. 12-16, 2007).
QUALCOMM Europe, "Speech Capacity Enhancements Using DARP", 3GPP TSG-GERAN #36, GP-071738, (Vancouver, Canada, Nov. 12-16, 2007).
China Mobile et al, "Multi-User Reusing-One-Slot (MUROS)", 3GPP TSG GERAN #36, GP-072027, Agenda Item 6.1, 7.1.5.18, (Vancouver, Canada, Nov. 12-16, 2007).
Nokia Corporation et al., "User Diversity With Orthogonal Sub Channels", 3GPP TSG GERAN #37, Tdoc GP-080170, Agenda Item 7.1.5.6, (Seoul, South Korea, Feb. 18-22, 2008).
Marvell, "Higher Order Modulations for MUROS", 3GPP TSG GERAN #37, Tdoc GP-080295, Agenda Item 7.1.5.6, (Seoul, Korea, Feb. 18-22, 2008).
Telefon AB LM Ericsson, "Frequency Hopping Schemes for MUROS", 3GPP TSG GERAN WG1 Ad Hoc EGPRS2/WIDER/MUROS/MCBTS, Agenda Item 3.1.4.1, 3.1.4.2, 3.1.4.3, AHG1-080019, (Sophia Antipolis, France, Apr. 8-11, 2008).
Third Generation Partnership Project, "Technical Specification Group GSM EDGE Radio Access Network; Mobile Station—Base Station System (MS-BSS) Interface; Data Link (DL) Layer Specification (Release 6)", 3GPP TS 44.006, V6.6.0 (Jun. 2007).
Third Generation Partnership Project, "Technical Specification Group GSM EDGE Radio Access Network; Mobile Station—Base Station System (MS-BSS) Interface; Data Link (DL) Layer Specification (Release 7)", 3GPP TS 44.006, V7.0.0 (Jun. 2007).
Third Generation Partnership Project, "Technical Specification Group GSM EDGE Radio Access Network; Mobile Station—Base Station System (MS-BSS) Interface; Data Link (DL) Layer Specification (Release 7)", 3GPP TS 44.006, V7.2.0 (Dec. 2008).
Third Generation Partnership Project, "Technical Specification Group GSM EDGE Radio Access Network; Mobile Station—Base Station System (MS-BSS) Interface; Data Link (DL) Layer Specification (Release 8)", 3GPP TS 44.006, V8.0.0 (Dec. 2008).
Third Generation Partnership Project, "Technical Specification Group GSM/EDGE Radio Access Network; Mobile radio interface layer 3 specification; Radio Resource Control (RRC) protocol (Release 8)" 3GPP TS 44.018 V8.3.0 (May 2008).
Third Generation Partnership Project, "Technical Specification Group GSM/EDGE Radio Access Network; Mobile radio interface layer 3 specification; Radio Resource Control (RRC) protocol (Release 8)", 3GPP TS 44.018 V8.7.0 (May 2009).
Third Generation Partnership Project, "Technical Specification Group GSM/EDGE Radio Access Network; Mobile radio interface layer 3 specification; Radio Resource Control (RRC) protocol (Release 9)", 3GPP TS 44.018 V9.1.0 (May 2009).
Ericsson, "Adaptive Symbol Constellation for MUROS (Downlink)", 3GPP TSG-GERAN #37, Tdoc GP-080114, Agenda Item 7.1.5.6, (Seoul, Korea, Feb. 18-22, 2008).
Marvell, "DARP Phase 1 MS Performance α-QPSK Modulation"; 3 GPP GERAN Teleconference #4 on MUROS, Agenda Item 6.3, (Jul. 2, 2008).
Third Generation Partnership Project, "Technical Specification Group GSM/EDGE Radio Access Network; Physical Layer on The Radio Path (Release 7)", 3GPP TS 45.001 V7.7.0, (Feb. 2008).
Third Generation Partnership Project, "Technical Specification Group GSM/EDGE Radio Access Network; Physical Layer on The Radio Path (Release 9)", 3GPP TS 45.001 V9.0.0, (May 2009).
Huawei Technologies Co., Ltd. "Associated Control Channel Performance of Downlink MUROS," 3GPP TSG-GERAN #39, Tdoc GP-081025, Agenda Item 7.1.5.10, (Florence, Italy, Aug. 25-29, 2008).

\* cited by examiner

METHOD AND APPARATUS FOR CONTROL CHANNEL OPERATION IN GERAN

CROSS REFERENCE TO RELATED APPLICATIONS

This application claims the benefit of U.S. Provisional Application Ser. No. 61/088,304 filed on Aug. 12, 2008, which is incorporated by reference as if fully set forth.

TECHNOLOGY FIELD

This application is related to wireless communications.

BACKGROUND

Various approaches have been developed to allow multiple users to reuse a single timeslot in time slotted wireless systems, referred to as Multiple Users Reusing One Slot (MUROS) technologies or Voice Services Over Adaptive Multiuser Channels On One Slot (VAMOS). One such approach involves the use of orthogonal sub-channels (OSC). The OSC concept allows a wireless network to multiplex two wireless transmit/receive units (WTRUs) that are allocated the same radio resource (that is, time slot) and Global System for Mobile communication (GSM) channel, thus the capacity may be significantly improved for a number of available transceiver (TRX) hardware and possibly for the spectrum resource. Furthermore, such a feature is expected to provide voice capacity improvement for both full rate and half rate channels.

In the uplink (UL) direction, the sub-channels are separated using non-correlated training sequences. The first sub-channel uses existing training sequences, and the second sub-channel uses new training sequences. Alternatively, only new training sequences may be used on both of the sub-channels. Using OSC enhances voice capacity with negligible impact to WTRUs and networks. OSC may be transparently applied for all Gaussian minimum shift keying (GMSK) modulated traffic channels (for example, for full rate traffic channels (TCH/F), half rate traffic channels (TCH/H), a related slow associated control channel (SACCH), and a fast associated control channel (FACCH)).

OSC increases voice capacity by allocating two circuit switched voice channels (that is, two separate calls) to the same radio resource. By changing the modulation of the signal from GMSK to quadrature phase shift keying (QPSK) (where one modulated symbol represents two bits), it is relatively easy to separate two users—one user on the X axis of the QPSK constellation and a second user on the Y axis of the QPSK constellation. A single signal contains information for two different users, each user allocated their own sub-channel.

In the downlink (DL), OSC is realized in a base station (BS) using a QPSK constellation that may be, for example, a subset of an 8-PSK constellation used for enhanced general packet radio service (EGPRS). Modulated bits are mapped to QPSK symbols ("dibits") so that the first sub-channel (OSC-0) is mapped to the most significant bit (MSB) and the second sub-channel (OSC-1) is mapped to the least significant bit (LSB). Both sub-channels may use individual ciphering algorithms, such as A5/1, A5/2 or A5/3. Several options for symbol rotation may be considered and optimized by different criteria. For instance, a symbol rotation of $3\pi/8$ would correspond to EGPRS, a symbol rotation of $\pi/4$ would correspond to $\pi/4$-QPSK, and a symbol rotation of $\pi/2$ may provide sub-channels to imitate GMSK. Alternatively, the QPSK signal constellation may be designed such that it resembles a legacy GMSK modulated symbol sequence on at least one sub-channel.

Several reasons favor QPSK as a choice for the MUROS/VAMOS modulation format. First, QPSK offers robust signal-to-noise ratio (SNR) vs. bit error rate (BER) performance. Second, QPSK may be realized through existing 8-PSK-capable RF hardware. Third, QPSK burst formats have been introduced for Release 7 EGPRS-2 for Packet-Switched Services.

An alternate approach of implementing MUROS/VAMOS in the downlink involves multiplexing two WTRUs by transmitting two individual GMSK-modulated bursts per timeslot. As this approach causes increased levels of inter-symbol interference (ISI), an interference-cancelling technology such as Downlink Advanced Receiver Performance (DARP) Phase I or Phase II is required in the receivers. Typically, during the OSC mode of operation, a base station (BS) applies DL and UL power control with a dynamic channel allocation (DCA) scheme to keep the difference of received downlink and/or uplink signal levels of co-assigned sub-channels within, for example, a ±10 dB window. The targeted value may depend on the type of receivers multiplexed and other criteria. In the uplink, each WTRU may use a normal GMSK transmitter with an appropriate training sequence. The BS may employ interference cancellation or joint detection type of receivers, such as a space time interference rejection combining (STIRC) receiver or a successive interference cancellation (SIC) receiver, to receive the orthogonal sub-channels used by different WTRUs.

OSC may be used in conjunction with frequency-hopping or user diversity schemes, either in the DL, in the UL, or both. For example, on a per-frame basis, the sub-channels may be allocated to different pairings of users, and pairings on a per-timeslot basis may recur in patterns over prolonged period of times, such as several frame periods or block periods.

Statistical multiplexing may be used to allow more than two WTRUs to transmit using two available sub-channels. For example, four WTRUs may transmit and receive speech signals over a 6-frame period by using one of two sub-channels in assigned frames.

An extension of the baseline concept called the a-QPSK modulation scheme has been introduced. The a-QPSK modulation scheme suggests a simple means of power control for the in-band and quadrature components of the QPSK symbol constellation. By using an a parameter, the relative power on the MUROS/VAMOS timeslot allocated to the first vs. the second sub-channel on the timeslot may be adjusted in a range of ±10-15 dB relative to each other. Using this approach, the absolute power allocated by the transmitter to the composite MUROS/VAMOS transmission no longer needs to be precisely ½ power for each user (equivalent to relative power of sub-channel 1/power sub-channel 2 at 0 dB). Other more desirable power ratios may be achieved, such as when one of the MUROS/VAMOS sub-channel (user) is in better signal conditions than the other user, and a power ratio of −3 dB (or higher) would result in better performance for the weaker MUROS/VAMOS user. Together with the absolute Tx power setting of the MUROS/VAMOS composite signal on the timeslot, the α-QPSK concept would result in a relative power control component for MUROS/VAMOS users.

Another possible extension of this baseline OSC proposal suggests multiplexing of more than just a simple fixed pair of users into the very same allocated burst in all frames by extending the concept to statistical multiplexing of more than just 2 users over a period of at least several frames in a GSM multi-frame structure. At any given point in time (that is, any "burst"), not more than 2 users will transmit using the 2 available sub-channels of the OSC burst. However, when using Half Rate (HR) codecs (any WTRU required to Tx/Rx 1 out of 2 frames), statistical multiplexing of more than just 2 users can be achieved. For example, four users can Tx/Rx their HR speech signals over any given 6 frame period using one of the two available OSCs per burst, and by transmitting only in their assigned frames.

An even further possible modification to the baseline OSC proposal suggests that re-use of GSM Frequency-Hopping (FH) techniques would result in both interference averaging and the discontinuous transmission (DTX) gains for OSC and non-OSC users, with gains spread relatively equally amongst the WTRUs in the cell. Similar to the first possible modification, in any given burst (i.e., timeslot) not more than 2 users will transmit using the 2 available sub-channels of the OSC burst. However, by assigning different frequency-hopping sequences/Mobile-Allocation-Index-Offset's (MAIO's) to the different WTRUs in the cell, any WTRU may be paired with another WTRU on the next occurrence of a burst. The pattern would repeat after a certain number of frames, as a function of the FH-list. Note that this is applicable to both DL and UL directions.

With regard to the UL direction, the MUROS/VAMOS proposals and/or extensions including the Frequency-Hopping concept for statistical multiplexing handsets suggest using normal GMSK transmission with different training sequences on the same time slot to allow the BS to distinguish between the two transmissions. Each of the two handsets would transmit a legacy GMSK modulated burst, unlike the OSC DL which may use QPSK. It is assumed that the BS uses either STIRC or SIC receiver to receive orthogonal sub channels used by different WTRUs.

The above mentioned proposals are not mutually exclusive. These proposals only differ in how to achieve the goals for MUROS/VAMOS using either existing functionality, or through introducing new capability into the WTRU design.

With respect to the aforementioned second technical proposal referring to Release 6 DARP-type I receiver implementations in handsets, MUROS/VAMOS suggests that speech services may be provided to two users simultaneously over the same physical channel, or timeslot. One of these multiplexed users can be a legacy user. The legacy WTRU could be either with or without single antenna interference cancelation (SAIC) or DARP support implemented. Similarly, a new type of MUROS/VAMOS equipment will rely on DARP-like interference-type cancelation receivers. In addition, new MUROS/VAMOS equipment may be expected to support features like extended training sequences.

According to existing GSM specifications, once a Traffic Channel Full Rate (TCH/F) is assigned to a WTRU, the BS and the WTRU will start communicating with each other, at the physical layer, according to a 26-Frame Multiframe protocol. In order to convey radio related parameters and signaling, a TCH is always associated with a Slow Associated Control Channel (SACCH). Moreover, there also exists a Fast Associated Control Channel (FACCH) to convey service related signaling between the WTRU and the network. Typical messages on SACCH are System Information in DL and Measurement Report in UL. The FACCH is normally used for Handover as well as Assignment messages when the WTRU is operating on a TCH. The WTRU may also operate in a Stealing Mode such that, when needed, it may steal from traffic resources and using them for signaling purposes.

Figure 1:
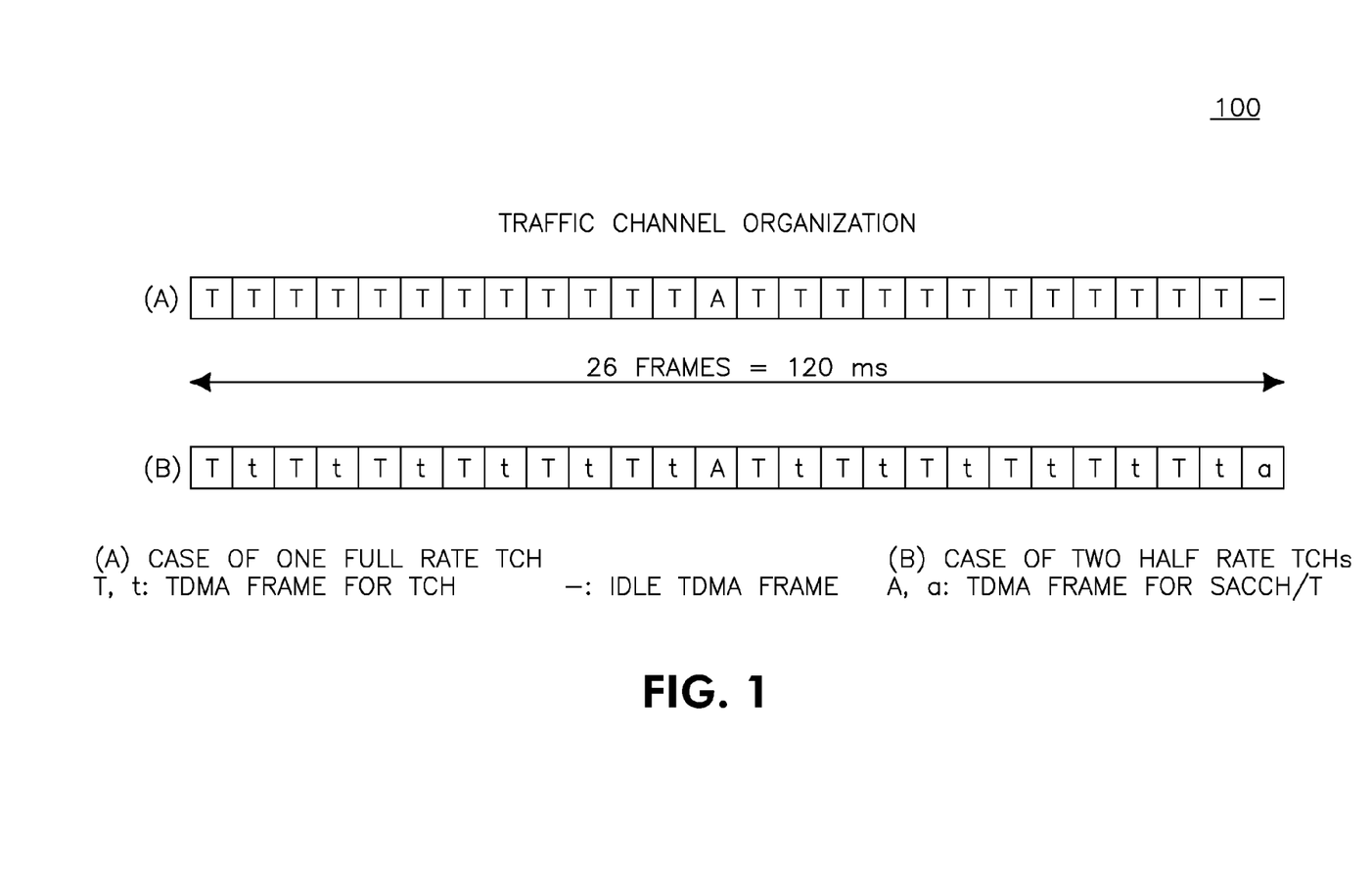
FIG. 1 is a diagram of a mapping of the TCH and SACCH on a 26-Frame multiframe according to existing GSM standards.

FIG. 1 illustrates the mapping of TCH and SACCH on a 26-Frame multiframe according to the existing GSM standards. It should be noted also that due to the nature of the half rate configuration, the same observations as for TCH/F also apply to the half rate configurations. There is one occurrence of SACCH and one occurrence of an Idle frame per multiframe. In MUROS/VAMOS operation, each of the two (or more) WTRUs multiplexed onto a Time Slot will still need to follow the mandated multiframe configuration.

Due to the robust coding and decoding performance of MUROS/VAMOS receivers on traffic channels, the associated control channels (i.e. SACCH and FACCH) interlace into the speech multi-frame and become un-decodable well before the actual speech bursts. It is of great importance to realize that in legacy GSM networks, the actual link between the WTRU and the BS is supervised by the SACCH according to a well-known radio link failure counter in GSM called Radio Link Timeout (RLT). This means that an entity (a WTRU or BS) shall release an active connection not when the actual speech burst decoding quality degrades below an unacceptable threshold, but rather upon successive failure of decoding a SACCH. Note that the actual RLT value is signaled by the network to the WTRU. Therefore, with the advent of MUROS/VAMOS, the decoding performance of the associated control channels in the speech multi-frames and their intimate linking into the radio link failure criterion constitutes the limiting factor. Accordingly, it is necessary to improve the performance of the SACCH to allow for MUROS/VAMOS operation even in weak signal or strong interference conditions.

SUMMARY

A BS may include a channel allocator configured to generate a multiframe that contains a first orthogonal sub-channel (OSC) and a second OSC, each OSC containing an Idle frame and a control channel frame such that a control channel frame of the first OSC overlaps with the Idle frame of the second OSC, and a transmitter configured to transmit the multiframe. A WTRU may include a receiver configured to receive the multiframe that contains a first OSC and a second OSC, each OSC containing an Idle frame and a control channel frame such that a control channel frame of the first OSC overlaps with the Idle frame of the second OSC. The control channel frame may be shifted by one or more slots. The multiframe may contain a control channel frame that is swapped with an Idle frame.

BRIEF DESCRIPTION OF THE DRAWINGS

A more detailed understanding may be had from the following description, given by way of example in conjunction with the accompanying drawings wherein.

DETAILED DESCRIPTION

When referred to herein, the terminology "wireless transmit/receive unit (WTRU)" includes but is not limited to a user equipment (UE), a mobile station, a fixed or mobile subscriber unit, mobile station (MS), a pager, a cellular telephone, a personal digital assistant (PDA), a computer, or any other type of user device capable of operating in a wireless environment. When referred to herein, the terminology "base station" includes but is not limited to a Node-B, a site controller, an access point (AP), or any other type of interfacing device capable of operating in a wireless environment.

The subject matter disclosed herein may be applicable to all realizations of the MUROS/VAMOS concept. They are applicable to, for example, approaches that use: (1) OSCs multiplexed signals by means of modulation, including QPSK modulation; (2) signals relying on interference-cancelling receivers which employ, for example, Downlink Advanced Receiver Performance (DARP) technology; and (3) a combination of OSC and signals relying on interference-cancelling receivers. Additionally, although examples may be provided indicating a particular modulation type, the principles described herein may equally be applied to other modulation types, including GMSK (Guassian Minimum Shift Keying), 8-Phase Shift Keying (8-PSK), 16-Quadrature Amplitude Modulation (QAM), 32-QAM, and other modulation types.

Variable SACCH misalignments may be used to improve the SACCH allocation in GERAN multiframes. For example, variable SACCH misalignments may be used in scenarios involving multiplexing with a MUROS/VAMOS capable WTRU or a legacy WTRU. According to this method, the SACCH occurrences for MUROS/VAMOS multiplexed users may be misaligned or shifted to provide the opportunity to exclusively use the full timeslot resource for a single user. Alternatively, the SACCH occurrences may be misaligned or shifted to provide a transmission opportunity to achieve better control channel decoding performance. The following examples apply to both the full rate and half rate scenarios.

Figure 2:
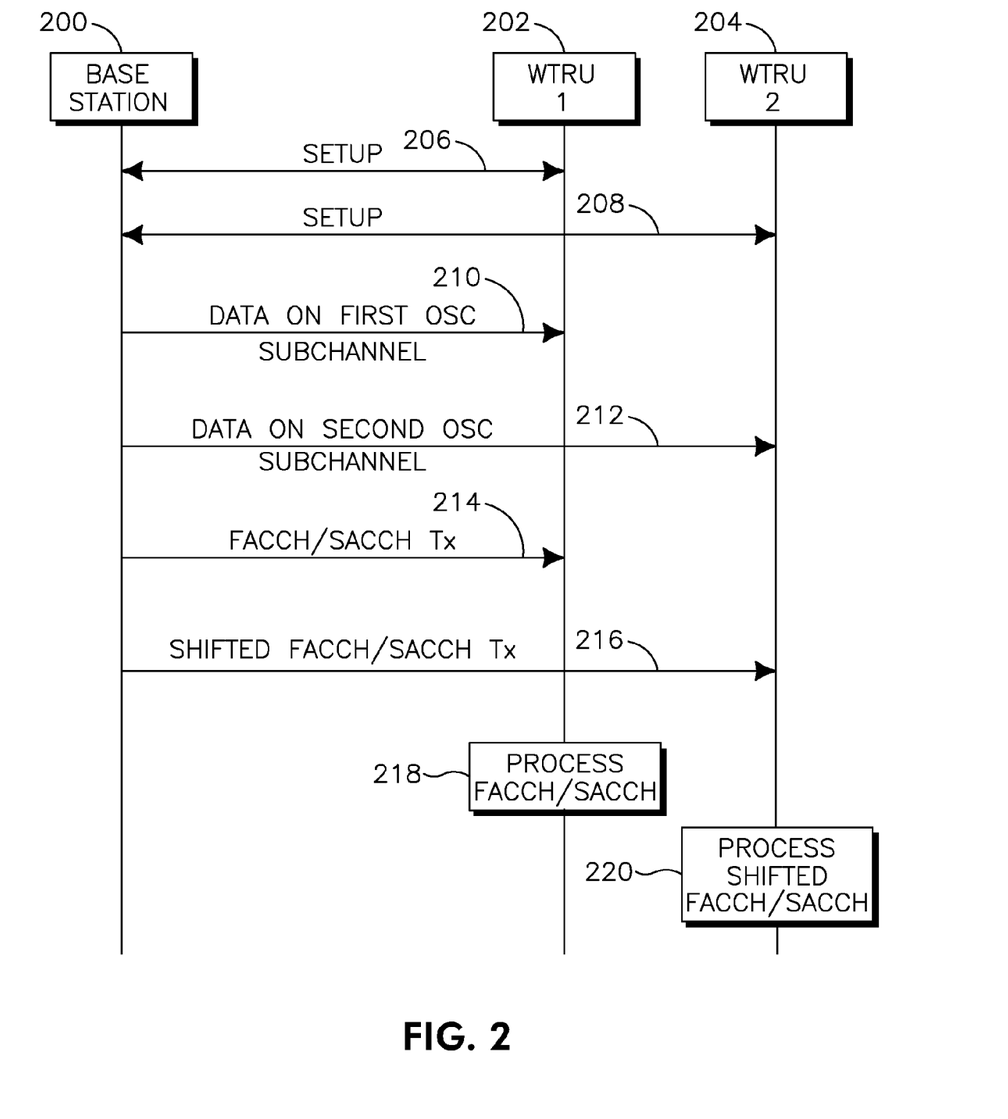
FIG. 2 is a diagram of an example scenario for the transmission of control data on the FACCH or SACCH indicating a recipient WTRU in the context of MUROS/VAMOS.

FIG. 2 shows a transmission scenario using a variable misalignment of control data on the FACCH or SACCH in the context of MUROS/VAMOS. FIG. 2 shows a BS 200 in communication with a first WTRU 202 and a second WTRU 204. The first WTRU 202 performs 206 a resource assignment, registration, or other set up procedure as described above. The second WTRU 204 performs 208 a similar procedure. Performance of the set up procedures 206, 208 may involve communication of signals from the BS 200 to the WTRUs 202, 204 as described above, the signals indicating a relationship between the WTRUs and identifiers that will correspond to the WTRUs 202, 204 in subsequent SACCH/FACCH transmissions. The first WTRU 202 receives data 210 from the BS 200 on a first OSC in a timeslot. The second WTRU 204 receives data 212 from the BS 200 on a second OSC in the timeslot. The BS 200 generates a FACCH or SACCH transmission as described above and sends the transmission 214, 216 to both the first WTRU 202 and the second WTRU 204.

Figure 3:
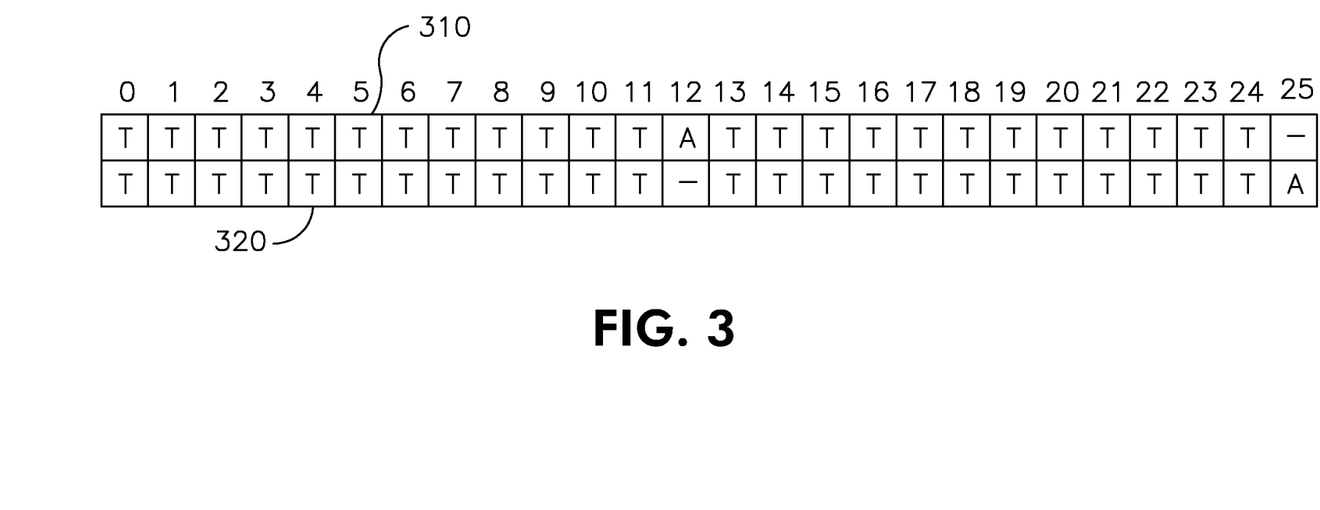
FIG. 3 is a diagram of an example multiframe misalignment.

FIG. 3 is a diagram of an example OSC multiframe misalignment. In this example, the mapping of SACCH and the Idle frame occurrences may be swapped for the MUROS/VAMOS capable WTRU. Referring to FIG. 3, a first WTRU may use a first OSC multiframe 310 when using MUROS/VAMOS resources. A second WTRU may use an OSC multiframe 320 when using the same MUROS/VAMOS resource. In the first OSC multiframe, the SACCH frame is in slot 12 and the Idle frame is in slot 25. In the second OSC multiframe 320, the SACCH frame and the Idle frame are swapped such that the SACCH frame is in slot 25 and the Idle frame is in slot 12. This swapping of the SACCH and Idle frames allows both WTRUs to decode the SACCH and allow MUROS/VAMOS operation in weak signal and/or strong interference conditions.

Figure 4:
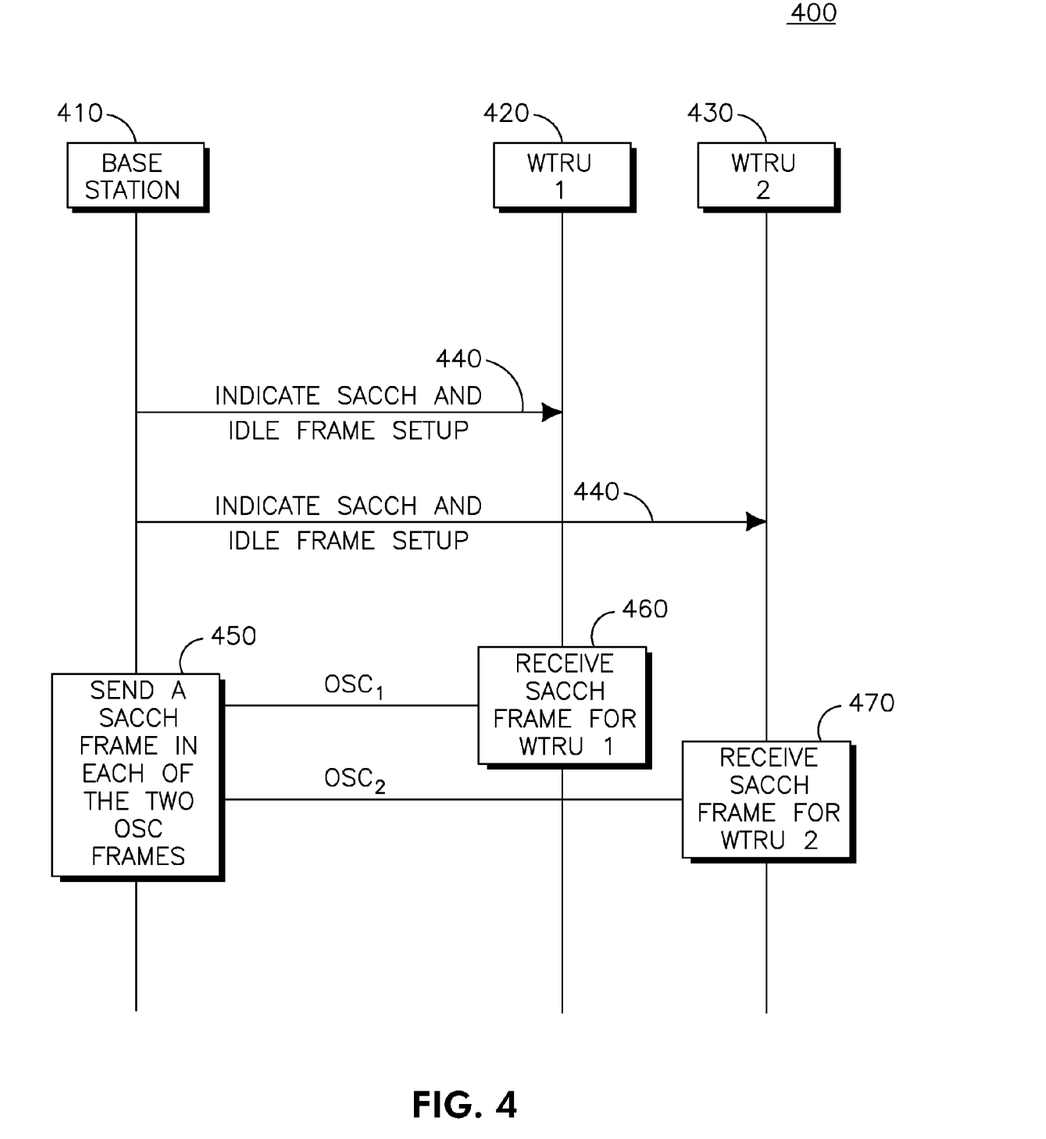
FIG. 4 is a diagram of an example SACCH transmission scenario.

FIG. 4 is a diagram of an example SACCH transmission scenario 400. Based on the OSC multiframe misalignment described above, transmission of the SACCH to the first WTRU may be performed using the full power per timeslot, or a more robust modulation type such as GMSK. The BS 410 informs the MUROS/VAMOS capable WTRUs 420, 430, for example, during the channel assignment phase, that a SACCH frame and Idle frame are swapped in the multiframe configuration 440. The BS 410 then sends a SACCH frame in each of the two OSC frames in every multiframe 450, one for the first WTRU 460 and another one for the second WTRU 470. It is important to realize that, when doing so, the BS may choose to transmit a GMSK burst during the SACCH frame with higher power as opposed to a QPSK burst since one of the WTRUs always assumes that this frame is an idle one.

In the event that two MUROS/VAMOS capable WTRUs are multiplexed in the same timeslot, both of them must be notified by the network about the applied SACCH/Idle configuration. When a legacy WTRU is assigned to use MUROS/VAMOS resources along with a MUROS/VAMOS-capable WTRU, the legacy WTRU must use the legacy multi-frame format (SACCH in frame 13), whereas the MUROS/VAMOS-capable WTRU uses the modified format (SACCH in frame 26).

Figure 5:
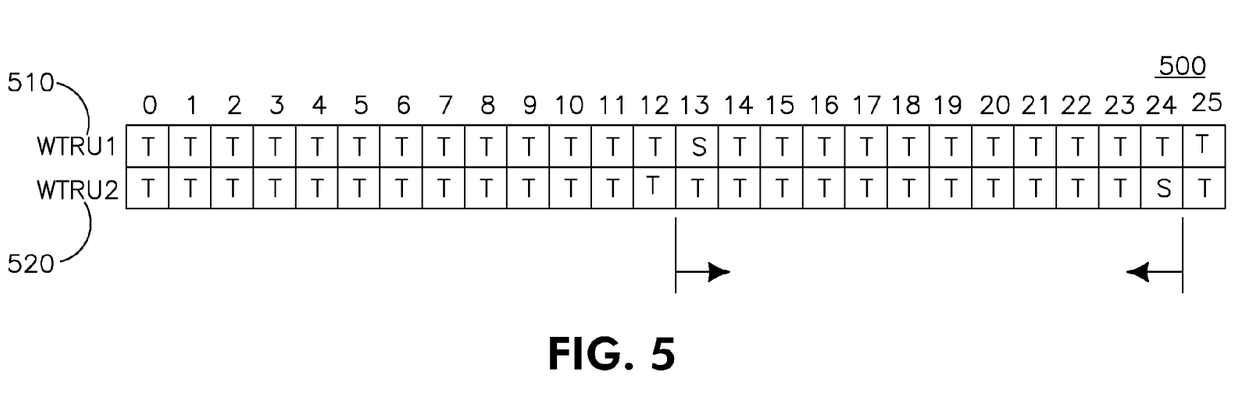
FIG. 5 is a diagram of an example multiframe misalignment scenario with a legacy WTRU and a MUROS/VAMOS-capable WTRU.
Figure 6:
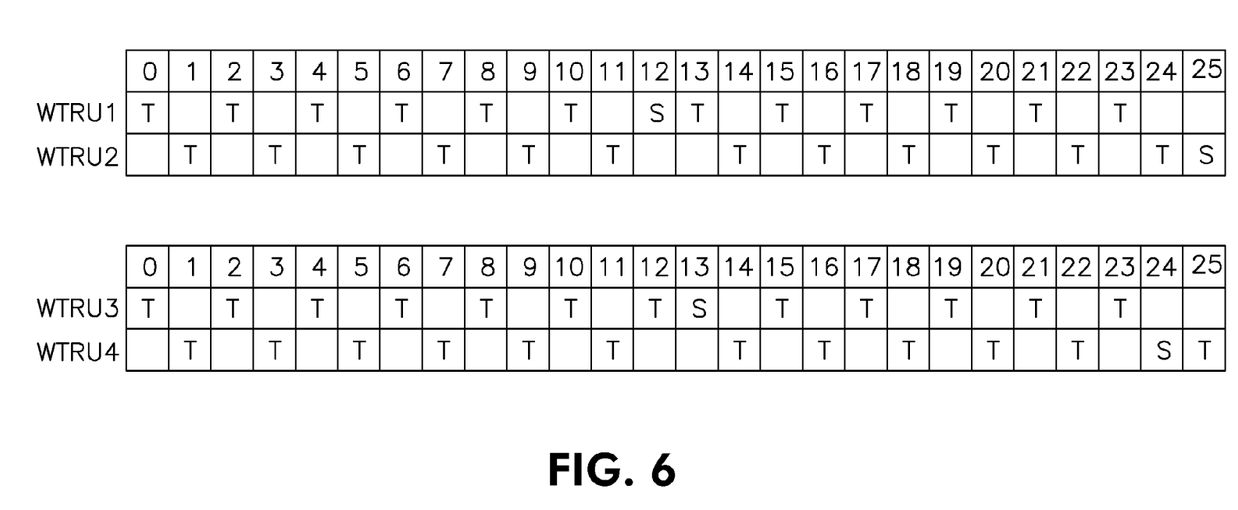
FIG. 6 is a diagram of an example multiframe misalignment applied to a half rate scenario.

FIG. 5 is an example of a full rate multiframe misalignment scenario 500 in a wireless communication system with legacy WTRUs and MUROS/VAMOS-capable WTRUs. Referring to FIG. 5, WTRU1 510 and WTRU2 520 are two WTRUs paired on a channel multiframe, where WTRU1 510 is a legacy WTRU and WTRU2 520 is a MUROS/VAMOS-capable WTRU. As shown in FIG. 5, the SACCH frame for WTRU1 510 is shifted forward to frame 14, and the SACCH frame for WTRU2 520 is shifted to frame 25. The depicted frame shift of the SACCH is for illustration only and it is understood that the shift is variable. Additionally, the number of frames of the shift may change from multiframe to multiframe. FIG. 6 is an example of a multiframe misalignment that may be adapted for a half rate scenario applying similar principles as described above.

An alternative method of improving the SACCH performance includes applying a power offset in the transmit power level of the SACCH frames when compared to the TCH frames. The power offset may be configurable, or a fixed rule-based power offset compared to either one or more reference frames.

In yet another alternate method, the SACCH performance may be improved by modifying a radio link failure criterion used in legacy GSM networks such that the radio link failure criterion does not rely on the associated control channels, or at least, not exclusively. For example, an RLT criterion may be used as a threshold for the number of RLT failures before a call is dropped. In this example, the RLT criterion may be modified to check against missed SACCH decodings and/or link quality, such as bit error rate (BER) or other representative quality measures, as observed on the traffic channel. The RLT criterion may be relaxed through increasing the RLT value for WTRUs operating in MUROS/VAMOS environments.

Figure 7:
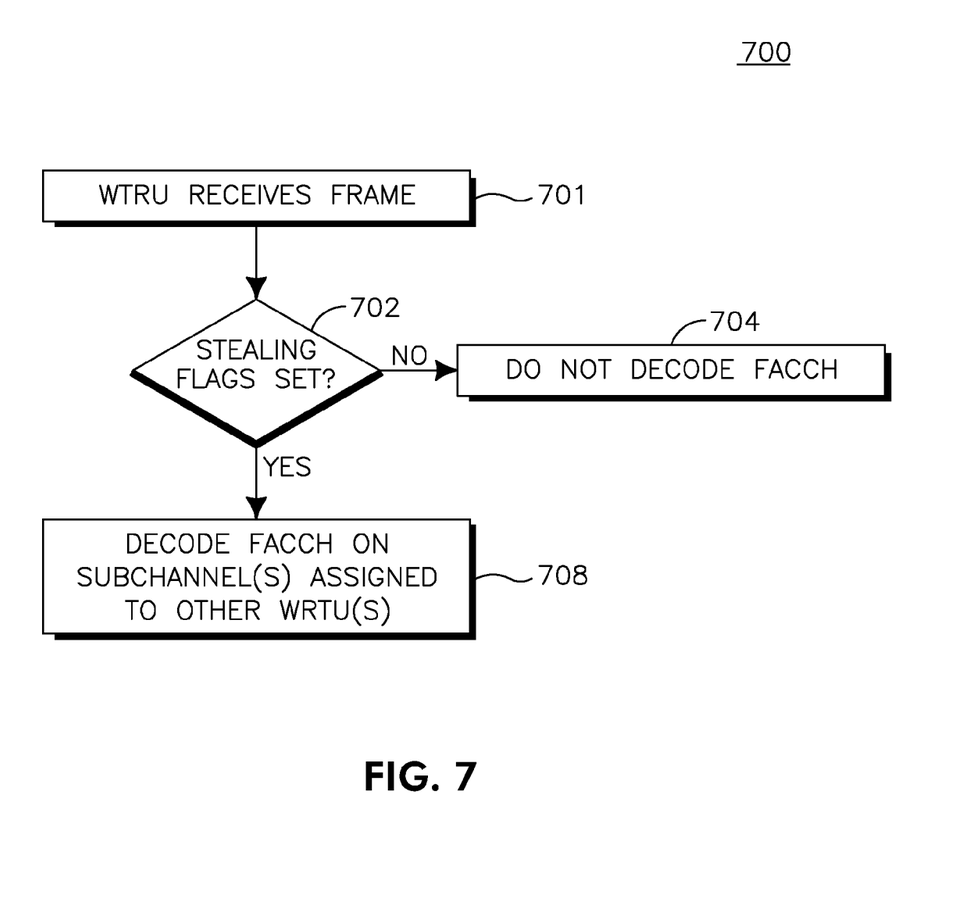
FIG. 7 is a flow diagram of a method for a WTRU to receive a FACCH on a sub-channel reserved for another WTRU.

In another embodiment, stealing flags may be used to indicate resource sharing among OSCs assigned to different WTRUs for control channel transmission. FIG. 7 is a flow diagram of a method 700 for a WTRU to receive a FACCH on a sub-channel reserved for another WTRU. The WTRU receives 701 a frame. The frame may be a voice frame or a FACCH control frame. The WTRU analyzes 702 the frame to check if stealing flags are set to indicate a FACCH transmission. If the stealing flags are not set, the WTRU does not decode 704 for a FACCH transmission. If the stealing flags are set to indicate a FACCH transmission, then the WTRU decodes 708 the FACCH transmission on sub-channels of one or more WTRUs with which it is multiplexed. Alternatively, the WTRU may decode the FACCH transmission on its own sub-channel as well as the sub-channel of one or more other WTRUs. In another alternative, resource stealing from the other OSC may be used to convey the associated control channel (SACCH or FACCH) to a WTRU.

Stealing flags may indicate not only the presence of the FACCH, but also which OSC the FACCH is carried on. For example, where QPSK or 16-QAM is used, the two stealing flag bits may indicate an OSC based on the following organization: "00" indicates a speech frame; "01" indicates a FACCH on a first OSC; and "11" indicates a FACCH on a second OSC. The specific code points may of course be changed as their meanings are implementation details.

Alternatively, rules may be defined to determine when a FACCH for a first WTRU may be carried on the OSC allocated for a second WTRU. For example, the first WTRU may search for a FACCH addressed to it by decoding a second WTRU's OSC at every Nth occurrence or according to a pre-determined assignment pattern. A WTRU may decode SACCH transmissions on the other OSC to determine if a message for it is carried there when multi-frame structures for individual WTRUs or groups of WTRUs are offset compared to those corresponding to other OSCs.

An identifier indicating a recipient WTRU of a SACCH or FACCH message may be realized in layer one, layer two, or layer three messages, used individually or in combination. For example, a portion of an identifier may be carried in layer two, while another portion of the identifier may be carried in layer three. As a more specific example, a stealing flag may indicate the presence of the FACCH to a WTRU, and/or indicate a sub-channel on which the FACCH should be received. The FACCH message itself may then also include an indicator according to any of the embodiments described above that identifies the WTRU as the recipient.

Figure 8:
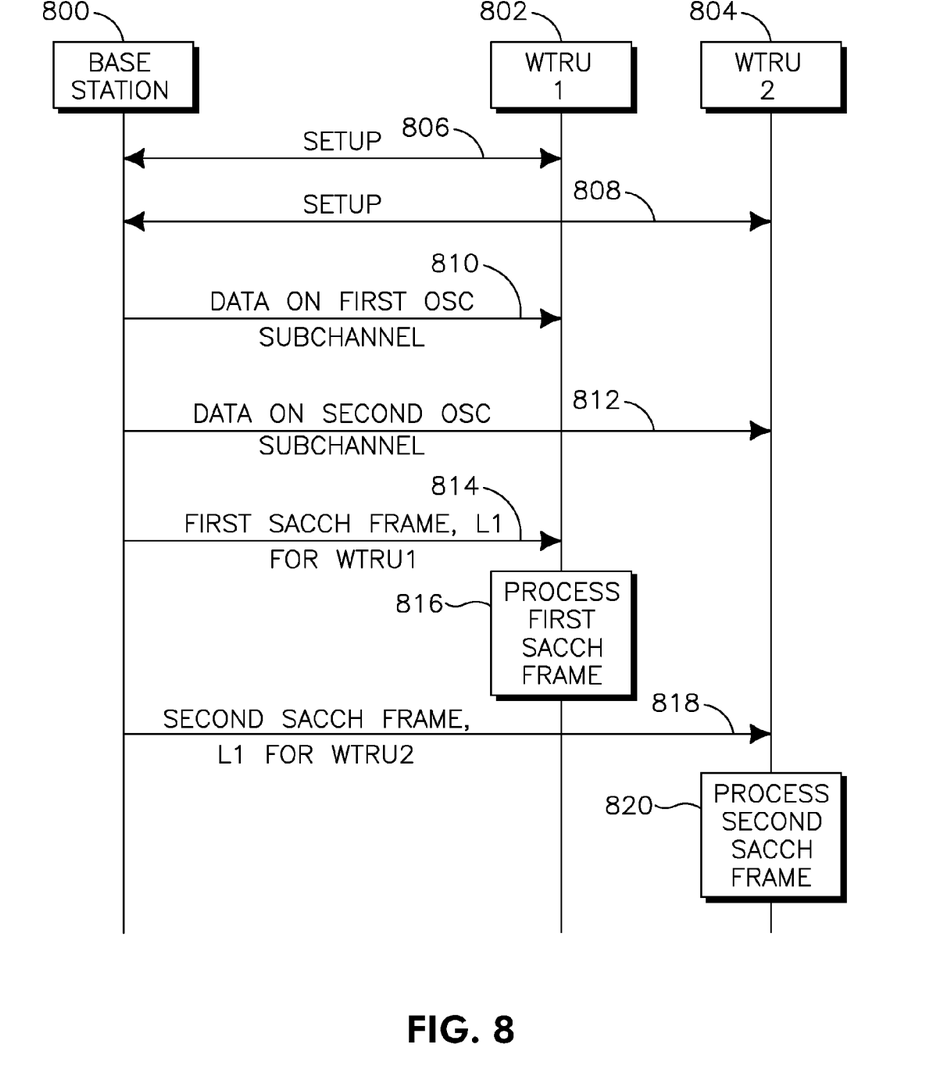
FIG. 8 is a diagram of an example approach for transmitting control information targeted at a WTRU in the context of OSC using layer one parameters.

FIG. 8 is a flow diagram of an example approach to sending control information targeted at a WTRU in the context of OSC using layer one parameters. In the DL, a BS transmits System Information messages to WTRUs over the majority of the SACCH lifetime. In most instances, the layer three information included in the System Information message is the same for all of the WTRUs multiplexed on a same timeslot using OSC. However, there are also two layer one parameters (the Timing Advance (TA) and the Power Command (PC)) that are sent in LAPDm frames used for SACCH. These two parameters are appended as two octets by layer one onto the LAPDm frames for SACCH. Therefore, although the layer three contents of the System Information messages may be the same for multiple WTRUs multiplexed onto a timeslot, the layer one parameters may be different for the different WTRUs.

FIG. 8 shows layer one parameters sent to the WTRUs in an OSC pair in alternating SACCH frames. The first WTRU 802 performs 806 a resource assignment, registration, or other set up procedure to coordinate communications with the BS 800. The second WTRU 804 performs 808 a similar procedure. Performance 806, 808 of the set up procedures may involve the transmission of signals from the BS 800 to the WTRUs 802, 804 for coordinating the reception and interpretation of layer one parameters as described in further detail below. For example, the set up procedures may involve data transmitted from the BS 800 to the WTRUs 802, 804 indicating that SACCH frames will include layer one parameters for the two WTRUs 802, 804 on an alternating basis. The first WTRU 802 receives data 810 from the BS 800 on a first OSC in a timeslot. The second WTRU 804 receives data 812 from the BS 800 on a second OSC in the timeslot. The BS 800 generates a first SACCH transmission containing layer one parameters such as the TA and PC parameters as described above, with the intended recipient being the first WTRU, and the frame is received 814 by the first WTRU 802. The first WTRU 802 processes 816 the control data in the frame including the layer one parameters and reacts accordingly. The second WTRU may or may not also receive and process the first SACCH frame (not depicted), though it will be configured to ignore the layer one parameters included in the frame. The BS 800 generates the next SACCH frame to contain layer one parameters intended for the second WTRU 804 and transmits 818 the second SACCH frame. The second SACCH frame is received and the layer one parameters are processed 820 by the second WTRU 804, and the second WTRU 804 reacts accordingly. The second SACCH frame may or may not be received and processed by the first WTRU (not depicted), but the first WTRU 802 may be configured to ignore the layer one parameters included in the frame. This method may then continue, with alternating SACCH transmissions including layer one parameters for the two WTRUs 802, 804.

In addition to alternating SACCH transmissions as shown in FIG. 8, the SACCH transmissions may be sent according to various other orders and transmission patterns. As shown in FIG. 8, the rules for associations between the orders of the SACCH and the intended recipients may be signaled during a set up procedure as described in FIG. 8. Alternatively, the rules may be derived implicitly based on known parameters.

Further, a rule associating a particular SACCH occurrence with either a single WTRU or group may be used. For example, a first WTRU may decode the SACCH at predetermined occurrences, but will disregard the layer one parameters received at these occurrences because they are intended for a second WTRU. The first WTRU also decodes the SACCH at other predetermined occurrences, but does act on the layer one parameters received at these other occurrences. The sets of predetermined occurrences may or may not overlap.

Figure 9:
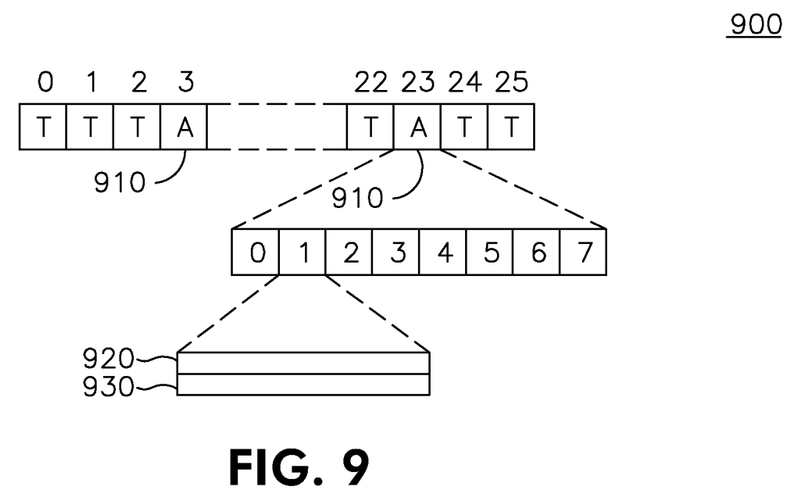
FIG. 9 is a diagram of an example multiframe format using a common SACCH addressed to more than one WTRU using the MUROS/VAMOS resource.

FIG. 9 is a diagram of an example multiframe format 900 using a common SACCH addressed to more than one WTRU using a MUROS/VAMOS timeslot. The multiframe 900 includes 26 frames, some of which are control channel frames 910. Each frame is divided into 8 timeslots, and each timeslot may be divided into a plurality of sub-channels, for example a first OSC 920 and a second OSC 930.

In a first example, information specific to a particular WTRU, such as layer one information containing TA and PC, may be multiplexed in several occurrences of the control channel frame 910. Since only a single SACCH or FACCH is required, the number of channel bits available is doubled for increased channel coding. Alternatively, the same number of channel coded bits may be achieved using a more robust modulation type such as GMSK. It is possible to apply this method to interlace or schedule either exclusively, or a combination of a certain number of individual SACCHs addressed to a WTRU, with a certain number of common SACCHs addressed to more than one WTRU, for example using a first OSC 920 for WTRU1 and a second OSC 930 for WTRU2. Alternatively, a Repeated SACCH and/or Repeated FACCH feature 810 may be used in conjunction with MUROS/VAMOS operation.

Alternatively, a higher number of occurrences per multiframe (or time period) than in legacy GSM speech multiframes is used for the associated control channels 910 in conjunction with MUROS/VAMOS operation. The increased number of transmission opportunities may in turn be used to provide more decoding opportunities to the WTRU (and therefore, increase the chance not to meet the radio link timeout criteria), or to increase the channel coding and improve upon decoding robustness.

In yet another alternative, Incremental-redundancy, Repetition and/or Chase Combining methods may be used for the associated control channels when used in conjunction with MUROS/VAMOS mode of operation. These may be employed upon successive occurrences of SACCH or FACCH.

Figure 10:
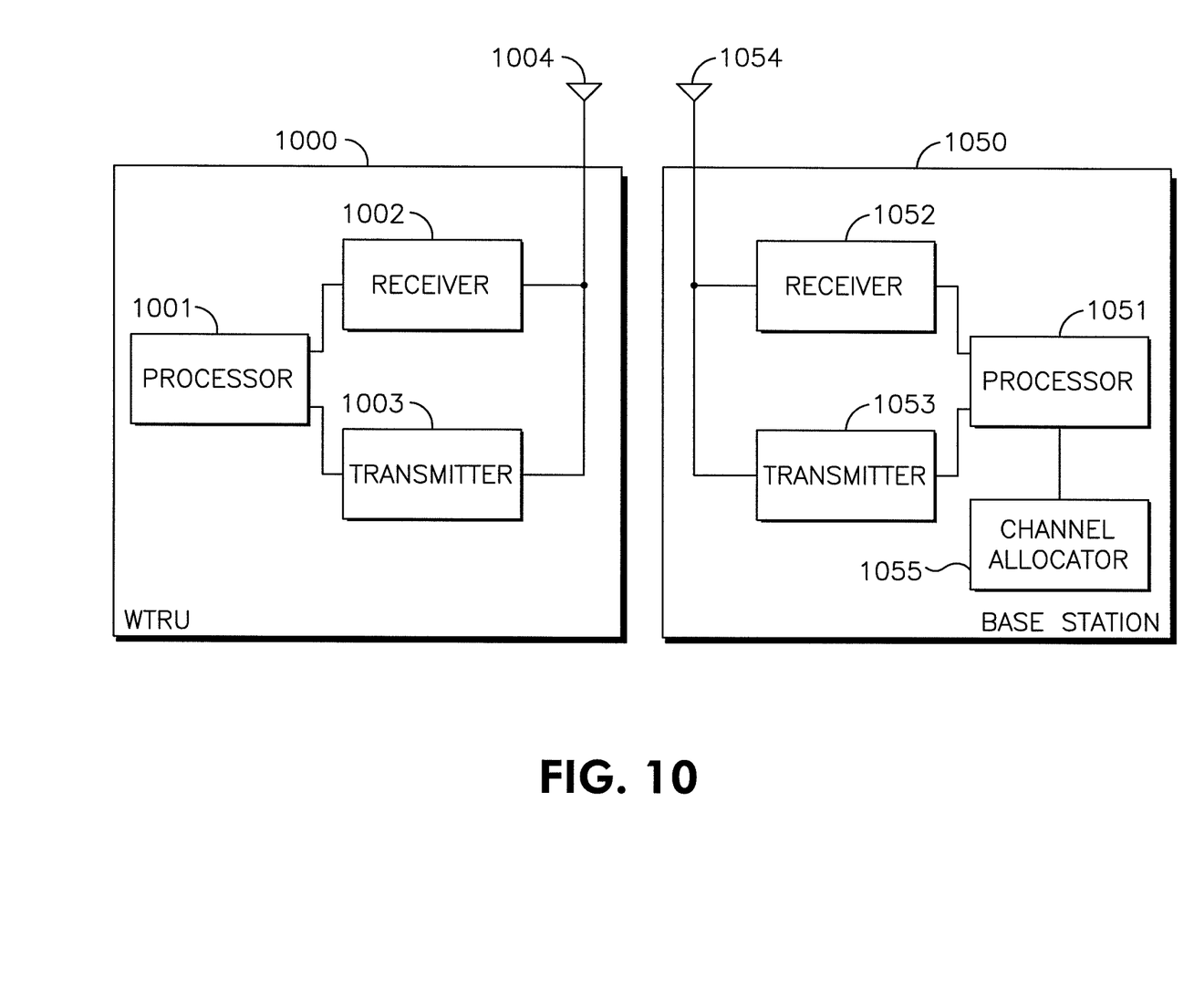
FIG. 10 is a functional block diagram of a WTRU and a BS.

FIG. 10 is a functional block diagram of a WTRU 1000 and a BS 1050 configured in accordance with the methods described above. The WTRU 1000 includes a processor 1001 in communication with a receiver 1002, transmitter 1003, and antenna 1004. The processor 1001 may be configured to process misaligned or shifted FACCH and SACCH messages as described above. The BS 1050 includes a processor 1051 in communication with a receiver 1052, transmitter 1053, antenna 1054, and a channel allocator 1055. The channel allocator 1055 may be part of the processor 1051, or it may be a separate unit in communication with the processor 1051. The channel allocator 1055 may be configured to generate misaligned or shifted FACCH and SACCH messages as described above. The WTRU 1000 may include additional transmitters and receivers (not depicted) in communication with the processor 1001 and antenna 1004 for use in multi-mode operation, as well as other components described above. The WTRU 1000 may include additional optional components (not depicted) such as a display, keypad, microphone, speaker, or other components.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a receiver configured to receive a signal in a multiframe, wherein the multiframe includes a plurality of frames, and wherein each of the plurality of frames includes at least one time division multiple access (TDMA) time slot comprising a first orthogonal sub-channel (OSC) and a second OSC, thereby enabling multiplexing of the WTRU and a second WTRU in a single one of the at least one TDMA timeslot,
wherein the WTRU receives first data in the first OSC while the second WTRU also receives second data in at least one of the frames of the multiframe,
wherein the WTRU receives, in a single frame of the multiframe, nothing in the first OSC while the second WTRU receives control information in the second OSC, and
wherein the WTRU receives, in the single frame of the multiframe, control information in the first OSC while the second WTRU receives nothing in the second OSC; and
a processor configured to decode the control information in the first OSC.

2. The WTRU of claim 1, wherein the control information in the first OSC or the control information in the second OSC is a slow associated control channel (SACCH) frame or a fast associated control channel (FACCH) frame.

3. The WTRU of claim 1, wherein the receiver is configured to receive a multiframe that contains slow associated control channel (SACCH) information in two frames.

4. The WTRU of claim 1, wherein the receiver is configured to receive a multiframe that contains layer three payload information and two layer one parameters.

5. The WTRU of claim 1, wherein the control information in the first OSC is swapped with an Idle frame in the first OSC.

6. The WTRU of claim 1, wherein the control information in the first OSC is shifted to an adjacent timeslot in the first OSC.

7. A method for use in a wireless transmit/receive unit (WTRU), the method comprising:
receiving a signal in a multiframe, wherein the multiframe includes a plurality of frames, and wherein each of the plurality of frames includes at least one time division multiple access (TDMA) time slot comprising a first orthogonal sub-channel (OSC) and a second OSC, thereby enabling multiplexing of the WTRU and a second WTRU in a single one of the at least one TDMA timeslot, wherein the WTRU receives first data in the first OSC while the second WTRU also receives second data in at least one of the frames of the multiframe, wherein the WTRU receives, in a single frame of the multiframe, nothing in the first OSC while the second WTRU receives control information in the second OSC, and wherein the WTRU receives, in the single frame of the multiframe, control information in the first OSC while the second WTRU receives nothing in the second OSC; and decoding the control information in the first OSC.

8. The method of claim 7, wherein the control information in the first OSC or the control information in the second OSC is a slow associated control channel (SACCH) frame or a fast associated control channel (FACCH) frame.

9. The method of claim 7, wherein the multiframe contains slow associated control channel (SACCH) information in two frames.

10. The method of claim 7, wherein the multiframe contains layer three payload information and two layer one parameters.

11. The method of claim 7, wherein the control information in the first OSC is swapped with an Idle frame in the first OSC.

12. The method of claim 7, wherein the control information in the first OSC is shifted to an adjacent timeslot in the first OSC.

13. A base station comprising:
a transmitter configured to transmit a signal in a multiframe, wherein the multiframe includes a plurality of frames, and wherein each of the plurality of frames includes at least one time division multiple access (TDMA) time slot comprising a first orthogonal subchannel (OSC) and a second OSC, thereby enabling multiplexing of a first wireless transmit/receive unit (WTRU) and a second WTRU in the at least one TDMA timeslot, wherein the base station transmits first data for the first WTRU in the first OSC and second data for the second WTRU in at least one of the frames of the multiframe, wherein the base station transmits, in a single frame of the multiframe, nothing for the first WTRU in the first OSC and control information in the second OSC, and wherein the base station transmits, in the single frame of the multiframe, control information for the first WTRU in the first OSC and nothing in the second OSC.

14. The base station of claim 13, wherein the control information in the first OSC or the control information in the second OSC is a slow associated control channel (SACCH) frame or a fast associated control channel (FACCH) frame.

15. The base station of claim 13, wherein the transmitter is configured to transmit a multiframe that contains slow associated control channel (SACCH) information in two frames.

16. The base station of claim 13, wherein the transmitter is configured to transmit a multiframe that contains layer three payload information and two layer one parameters.

17. The base station of claim 13, wherein the control information in the first OSC is swapped with an Idle frame in the first OSC.

18. The base station of claim 13, wherein the control information in the first OSC is shifted to an adjacent timeslot in the first OSC.

19. A wireless transmit/receive unit (WTRU) comprising:
a receiver configured to receive a first signal in a first time slot of a first frame of a multiframe, wherein the first signal comprises a first orthogonal sub-channel (OSC) and a second OSC to enable multiplexing of the WTRU and a second WTRU in the first time slot;

wherein the first OSC of the first signal includes information associated with an idle period for the first WTRU while the second OSC of the first signal contains control information for the second WTRU, and wherein the receiver is further configured to receive a second signal in a second time slot of a second frame of the multiframe, and the first OSC of the second signal contains control information for the first WTRU while the second OSC of the second signal contains information associated with an idle period for the second WTRU; and a processor configured to decode the control information in the first OSC of the second signal.

20. The WTRU of claim 19, wherein the control information in the first OSC of the first signal or the second signal or the control information in the second OSC of the first signal or the second signal is a slow associated control channel (SACCH) frame or a fast associated control channel (FACCH) frame.

21. The WTRU of claim 19, wherein the multiframe contains slow associated control channel (SACCH) information in two frames.

22. The WTRU of claim 19, wherein the multiframe contains layer three payload information and two layer one parameters.

23. The WTRU of claim 19, wherein the receiver is further configured to receive a signal wherein the control information in the first OSC of the signal is swapped with an idle frame in the first OSC of the signal.

24. The WTRU of claim 19, wherein the receiver is further configured to receive a signal wherein the control information in the first OSC of the signal is shifted to an adjacent timeslot in the first OSC of the signal.

25. A base station (BS) comprising:
a transmitter configured to transmit a first signal in a first time slot of a multiframe, wherein the first signal comprises a first orthogonal sub-channel (OSC) and a second OSC to enable multiplexing of a first wireless transmit/receive unit (WTRU) and a second WTRU in the first time slot;

wherein the transmitter is further configured to transmit a first frame of the multiframe, wherein the first OSC of the first signal contains information associated with an idle period for the first WTRU while the second OSC of the first signal contains control information for the second WTRU, and wherein the transmitter is further configured to transmit a second signal in a second time slot of a second frame of the multiframe, wherein the first OSC of the second signal contains control information for the first WTRU while the second OSC of the second signal contains information associated with an idle period for the second WTRU.

26. The BS of claim 25, wherein the control information in the first OSC or the control information in the second OSC is a slow associated control channel (SACCH) frame or a fast associated control channel (FACCH) frame.

27. The BS of claim 25, wherein the multiframe contains slow associated control channel (SACCH) information in two frames.

28. The BS of claim 25, wherein the multiframe contains layer three payload information and two layer one parameters.

29. The BS of claim 25, wherein the transmitter is configured to transmit the first signal or the second signal wherein the control information in the first OSC is swapped with an idle frame in the first OSC.

30. The BS of claim 25, wherein the transmitter is configured to transmit the first signal or the second signal wherein the control information in the first OSC is shifted to an adjacent timeslot in the first OSC.

31. A method for control channel operation comprising:
transmitting a first signal in a first time slot of a multiframe, wherein the first signal comprises a first orthogonal subchannel (OSC) and a second OSC to enable multiplexing of a first wireless transmit/receive unit (WTRU) and a second WTRU in the first time slot;
transmitting a first single frame of the multiframe, wherein the first OSC contains information associated with an idle period for the first WTRU while the second OSC contains control information for the second WTRU, and
transmitting a second signal in a second time slot of a second frame of the multiframe, wherein the first OSC of the second signal contains control information for the first WTRU while the second OSC of the second signal contains information associated with an idle period for the second WTRU.

32. The method of claim 31, wherein the control information in the first OSC or the control information in the second OSC is a slow associated control channel (SACCH) frame or a fast associated control channel (FACCH) frame.

33. The method of claim 31, wherein the multiframe contains slow associated control channel (SACCH) information in two frames.

34. The method of claim 31, wherein the multiframe contains layer three payload information and two layer one parameters.

35. The method of claim 31, wherein the control information in the first OSC is swapped with an idle frame in the first OSC.

36. The method of claim 31, wherein the control information in the first OSC is shifted to an adjacent time slot in the first OSC.

* * * * *

UNITED STATES PATENT AND TRADEMARK OFFICE
CERTIFICATE OF CORRECTION

| | | |
|---|---|---|
| PATENT NO. | : 8,942,187 B2 | Page 1 of 1 |
| APPLICATION NO. | : 12/539163 | |
| DATED | : January 27, 2015 | |
| INVENTOR(S) | : Dick et al. | |

It is certified that error appears in the above-identified patent and that said Letters Patent is hereby corrected as shown below:

IN THE SPECIFICATION

At column 2, line 43, after the word "the", delete "a" and insert thereof --α--.

At column 2, line 44, after the word "The", delete "a-QPSK" and insert thereof --α-QPSK--.

At column 2, line 47, after the word "an", delete "a" and insert thereof --α--.

Signed and Sealed this
Third Day of November, 2015

Michelle K. Lee
*Director of the United States Patent and Trademark Office*